United States Patent
Mullenborn et al.

(10) Patent No.: US 6,732,588 B1
(45) Date of Patent: May 11, 2004

(54) PRESSURE TRANSDUCER

(75) Inventors: Matthias Mullenborn, Lyngby (DK); Peter Scheel, Gentofte (DK); Pirmin Rombach, Lyngby (DK)

(73) Assignee: Sonionmems A/S, Lyngby (DK)

( * ) Notice: Subject to any disclaimer, the term of this patent is extended or adjusted under 35 U.S.C. 154(b) by 0 days.

(21) Appl. No.: 09/570,493

(22) Filed: May 12, 2000

Related U.S. Application Data

(63) Continuation-in-part of application No. 09/390,712, filed on Sep. 7, 1999, now abandoned.

(51) Int. Cl.[7] .................................................. G01L 7/08
(52) U.S. Cl. ............................. 73/715; 73/723; 73/724; 361/761; 361/764
(58) Field of Search .................... 73/715–724; 340/870; 374/120, 183, 184; 257/252, 248; 361/761, 764, 283.1, 283.4; 367/140, 181

(56) References Cited

U.S. PATENT DOCUMENTS

| | | | |
|---|---|---|---|
| 5,438,553 A | * 8/1995 | Wilson et al. | 367/240 |
| 5,452,268 A | * 9/1995 | Bernstein | 367/181 |
| 5,856,914 A | * 1/1999 | O'Boyle | 361/761 |
| 5,889,872 A | * 3/1999 | Sooriakumar et al. | 381/174 |
| 5,936,164 A | * 8/1999 | Sparks et al. | 73/724 |
| 6,088,463 A | * 7/2000 | Rombach et al. | 381/174 |
| 6,178,249 B1 | 1/2001 | Hietanen et al. | 381/174 |

FOREIGN PATENT DOCUMENTS

| | | | |
|---|---|---|---|
| DE | 4207950 C1 | * | 3/1992 |
| DE | 4207951 A1 | * | 3/1992 |
| EP | 0561566 A2 | * | 9/1993 |
| JP | 2000183365 A | * | 6/2000 |
| WO | WO 9622515 | * | 7/1996 |

OTHER PUBLICATIONS

"The first silicon–based micro–microphone", Elektronik og Data, No. 3, pp. 4–8, 1998.
Jeffrey T. Butler et al., "Multichip module packaging of microelectromechanical systems," Sensors and Actuators A 70 (1998), pp. 15–22.
K.W. Markus et al., "Smart Mems: Flip Chip Integration of mems and Electronics," SPIE, vol. 2448, pp. 82–92.
F. Mayer et al., "Flip–Chip Packaging for Smart MEMS," SPIE, vol. 3328, pp. 183–193.
Michael M. Maharbiz et al., "Batch Micropackaging by Compression–Bonded Wafer–Wafer Transfer".
T. Gessner et al., "Bonding and Metallization for a High Precision Acceleration Sensor," Electrochemical Society Proceedings vol. 95–27, pp. 297–308.

* cited by examiner

Primary Examiner—Andrew H. Hirshfeld
Assistant Examiner—Marissa Ferguson
(74) Attorney, Agent, or Firm—Harness, Dickey & Pierce, P.L.C.

(57) ABSTRACT

The present invention relates to compact solid state silicon-based condenser microphone systems suitable for batch production. The combination of the different elements forming the microphone system is easier and more economical to manufacture compared to any other system disclosed in prior art. In addition the invention is compatible with electronic equipment manufacturing processes, such as SMD pick and place techniques. The invention uses a transducer chip comprising a chamber, a diaphragm that is positioned at the first lower surface and covering the second opening of the transducer chip. The transducer chip is flip-chip mounted onto a post-processed chip also comprising a chamber. The microphone system can be electrically connected to an external substrate by conventional techniques such as wire bonding.

22 Claims, 3 Drawing Sheets

PRESSURE TRANSDUCER

This application is a continuation-in-part of application Ser. No. 09/390,712 filed on Sep. 7, 1999 now abandoned, the entire contents of which are hereby incorporated by reference.

FIELD OF THE INVENTION

The present invention relates to a transducer, such as a capacitive transducer, pressure transducer, sound transducer, etc. and more specifically to a pressure transducer that is compatible with semiconductor manufacturing techniques and practices.

BACKGROUND OF THE INVENTION

In the hearing instrument and mobile communication system industry, one of the primary goals is to make components of small sizes while still maintaining good electroacoustic performance and operability giving good user friendliness and satisfaction. Technical performance data include sensitivity, noise, stability, compactness, robustness and insensitivity to electromagnetic interference (EMI) and other external and environmental conditions. In the past, several attempts have been made to make microphone systems smaller while maintaining or improving their technical performance data.

EP 561 566 discloses a solid state condenser microphone having a field effect transistor (FET) circuitry and a cavity or sound inlet on the same chip. The techniques and processes for manufacturing a FET circuitry are quite different from the techniques and processes used in manufacturing transducer elements. Consequently, the transducer element and FET system disclosed in EP 561 566 requires two (or possibly more) separate stages of production which by nature makes the production more complicated and thereby also more costly.

The development of combined microelectromechanical systems (MEMS) has progressed significantly over the last years. This has primarily to do with the development of appropriate techniques for manufacturing such systems. One of the advantages of such combined systems relates to the size with which relative complicated systems involving mechanical microtransducers and specially designed electronics may be manufactured.

It is known to package micromachined transducers in SMD-packages (surface mount devices) in which a chip is die bonded on an organic or inorganic carrier (chip facing up) and wire bonded to leads which connect by soldering techniques to a printed circuit board metallisation. Such packages tend to be large and expensive.

It is an object of the present invention to provide a transducer that is easy to manufacture, that can be made available at a low cost, that includes an integrated semiconductor device, that has a small die size, and that is compatible with electronic equipment manufacturing processes, such as SMD pick and place techniques.

It is a still further object of the present invention to provide a sensor system where the distance between the transducer element and the electronics is minimised so as to minimise parasitics.

SUMMARY OF THE INVENTION

According to the invention the above and other objects are fulfilled by providing, in a first aspect, a transducer, such as a capacitive transducer, a pressure transducer, a sound transducer, a loudspeaker, etc. comprising a first substrate, such as a silicon substrate, with a first upper surface and a first lower surface opposite the first upper surface and enclosing a first chamber extending from a first opening of the first chamber at the first upper surface and through the first substrate to a second opening at the first lower surface, a first diaphragm that is positioned at the first lower surface and covering the second opening, and a second substrate, such as a silicon substrate, with a second upper surface and a second lower surface, the second substrate enclosing a second chamber extending into the substrate from a third opening at the second upper surface, the first substrate being positioned on the second substrate with the second opening aligned with the third opening.

The transducer may further comprise a first back plate that is arranged adjacent and substantially parallel to the first diaphragm. The first diaphragm and the first back plate may be conductive and form a capacitor in combination whereby a miniature condenser microphone is formed.

In a preferred embodiment of the invention, the first substrate is flip-chip mounted on the second substrate. The first diaphragm and the first back plate is connected to contact elements, such as solder bumps, on the first substrate. The second substrate has contact elements thereon corresponding to the contact elements of the first substrate. The first substrate is placed with its first lower surface on the second upper surface of the second substrate with the contacts in corresponding positions. When in position, the contacts are attached, e.g. by reflow soldering.

Further, the first substrate and the second substrate may have seal surfaces which surround the second and third openings, respectively. When the first substrate is secured to the second substrate the seal surfaces are connected to form a seal or a surrounding barrier. The seal may be an airtight seal, a hermetic seal, etc. The seal may be formed by a solder ring, an epoxy ring, etc.

Directional sensitivity may be obtained by introducing a fourth opening between the second chamber and the second lower surface.

Preferably, the second substrate further comprises an electronic circuit, such as an integrated circuit, such as an ASIC, etc, that is operationally connected to the first diaphragm. For example, in a condenser microphone according to the present invention, a commercially available ASIC chip may be further processed by etching the second chamber into the chip. Subsequently, the ASIC is connected to the first diaphragm and the first back plate via the above-mentioned contact elements. Preferably, the seal also surrounds the integrated circuit.

It is preferred to encapsulate the transducer in a polymer or in a metal layer that is sprayed, evaporated, or electroplated onto the transducer. The encapsulation should not cover the first opening in the first substrate allowing the environment to communicate with the diaphragm. Preferably, the first opening is covered by a filter that is transparent to pressure or to pressure changes. This method of encapsulation eliminates the need for a container made of metal or ceramic whereby weight and size of the transducer is reduced the transducer is thermally matched to the substrate.

A second way of obtaining directional sensitivity is by using two or more sensing elements such as an array of sensors e.g. with separated back chambers in the second substrate in order to detect a phase difference of an acoustic wave.

Thus, in a second aspect, the present invention relates to directional transducers, such as directional pressure transducers, applying more than one pressure transducer. In order to obtain directional sensitivity, the directional transducer may, in addition to the transducer according to the fist aspect, further comprise a third chamber being enclosed in the first substrate and extending from a fifth opening of the third chamber at the first upper surface and through the first substrate to a sixth opening at the first lower surface, a second diaphragm that is positioned at the first lower surface and covering the sixth opening of the third chamber, and a fourth chamber extending into the second substrate from a seventh opening at the second upper surface, the sixth opening of the fourth chamber being aligned with the seventh opening.

The transducer may further comprise a second back plate that is arranged adjacent and substantially parallel to the second diaphragm. The second diaphragm and the second back plate may be conductive and form a capacitor in combination. Furthermore, the second diaphragm and the second back plate may be operationally connected to the integrated circuit via solder bumps.

Preferably, a filter covers the fifth opening. The transducer may further comprise an encapsulation enclosing the first and second substrates and having an opening aligned with the first and fifth opening.

BRIEF DESCRIPTION OF THE DRAWINGS

In the following the invention will be explained with reference to the drawing, in which.

DETAILED DESCRIPTION OF THE INVENTION

Figure 1:
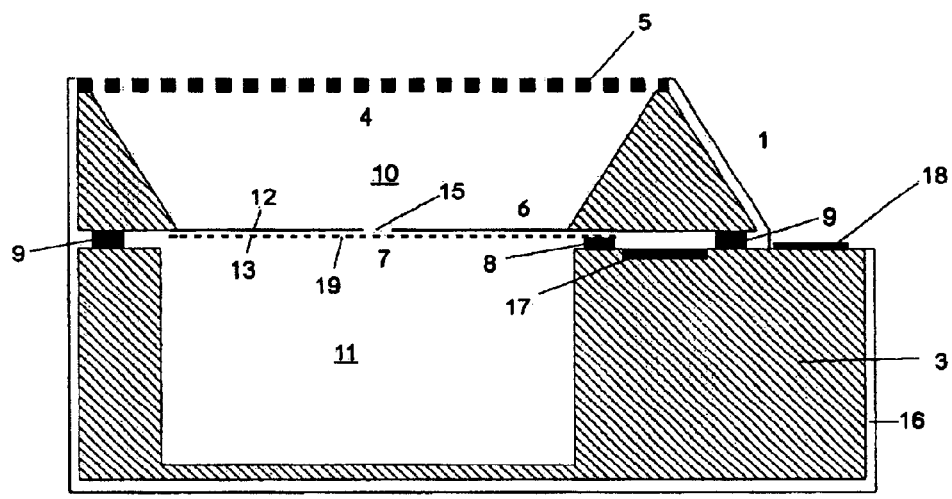
FIG. 1 is a cross section of a microphone according to the invention.
Figure 2:
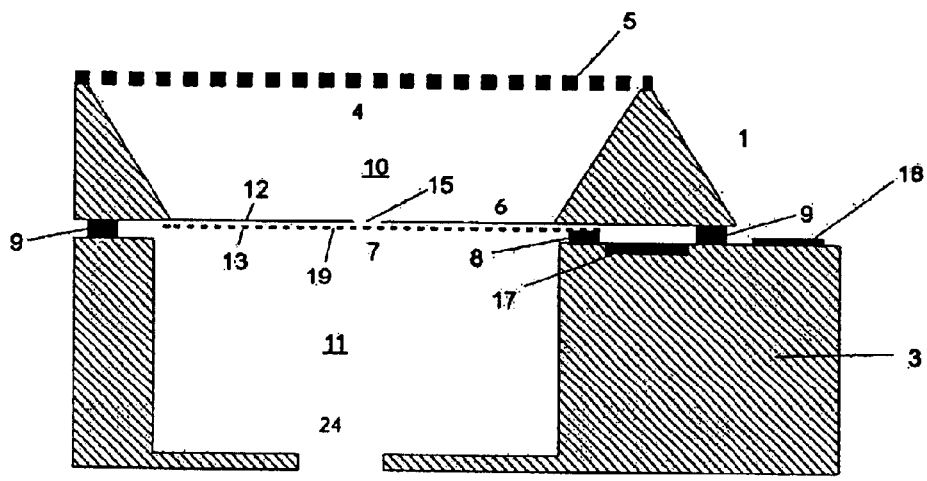
FIG. 2 is a cross section of a directional microphone with one pressure grading sensing element.
Figure 3:
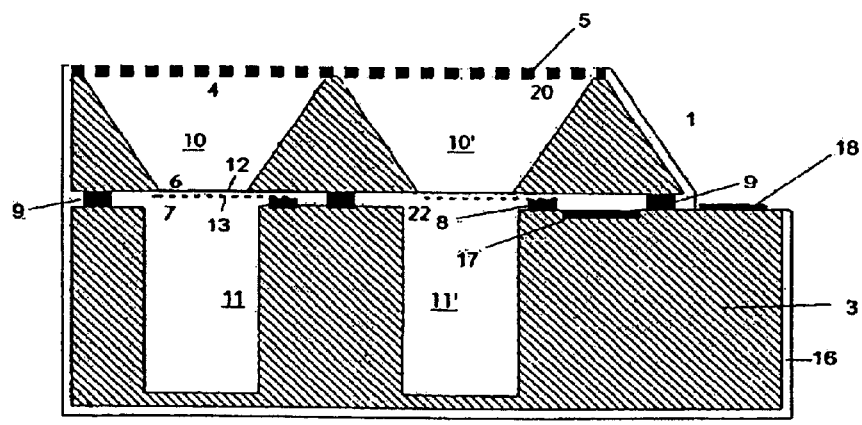
FIG. 3 is a cross section of a directional microphone formed by an array of absolute pressure microphones using the detected phase difference.

In FIGS. 1, 2, and 3, dimensions such as material thickness and mutual distances and possibly other proportions are not necessarily drawn to the same scale. The size of the microphones is about 1–4 mm.

The microphone illustrated in FIG. 1 has the following structure. A silicon transducer chip 1 with a first chamber 10 etched therein extending from a first opening 4 at the upper surface and through the transducer to a second opening 6, carries a diaphragm 12 and a back plate 13 covering the second opening 6 in the transducer chip. The transducer chip 1 with the diaphragm 12 and a back plate 13 may be manufactured as described in the co-pending Danish patent application PA 199800671. The diaphragm 12 and the back plate 13 are both electrically conductive and are arranged parallel in close proximity to each other, so that they form an electrical capacitor. (See also 19980120US.)

The back plate 13 has a plurality of perforations 19 making it acoustically transparent, and the diaphragm 12 has a tiny vent hole 15 for equalising the static pressure on both sides of the diaphragm 12.

The transducer chip 1 is flip-chip mounted via solder bumps 8 onto a post-processed silicon chip 3 comprising an electric circuit 17, such as an integrated circuit, on a surface thereof. The post-processed silicon chip 3 also has a second chamber 11 etched into it having a third opening 7. The transducer chip 1 is secured to the silicon chip 3 by means of an electrically conductive solder sealing ring 9 or by other means making an airtight seal.

It is an advantage of the invention that the transducer chip 1 and the silicon chip 3 are both based on silicon substrates, thereby avoiding thermally-induced stresses.

The diaphragm 12 and the back plate 13 are electrically connected to a number of separate solder bumps 8, which connect the diaphragm 12 and the back plate 13 to the silicon chip 3.

The first opening 4 is covered with a filter 5 or a flexible sheet or diaphragm of acoustically transparent material. The whole structure is encapsulated in a polymer or metal encapsulation 16 leaving the filter 5 and pad 18 free.

The function of the above-described structure is as follows. The first opening 4 functions as a sound inlet, and ambient sound pressure enters through the filter 5 covering the first opening 4 to the first chamber 10 functioning as a front chamber for the microphone. The sound pressure deflects the diaphragm 12, which causes the air between the diaphragm 12 and the back plate 13 to escape through the perforations 19. The chamber 11 functions as a back chamber for the microphone. The diaphragm 12 is movable relative to the back plate 13 in response to the sound pressure. When the diaphragm 12 is moved in response to the incident sound, the electrical capacitance of the electrical capacitor formed by the diaphragm 12 and the back plate 13 will vary in response to the incident sound. The integrated circuit 17 on the silicon chip 3 is electrically connected to the diaphragm 12 and the back plate 13 via the separate solder bumps 8. The integrated circuit 17 is designed to detect variations in the electrical capacitance of the capacitor formed by the diaphragm 12 and the back plate 13. The integrated circuit 17 has electrical connections to the pad 18 for electrically connecting it to a power supply and other electronic circuitry in e.g. a hearing instrument.

Variations and modifications in the herein described system, within the scope of transducers such as pressure transducers and capacitive transducers, will undoubtedly suggest themselves to those skilled in the art. Accordingly, the foregoing description should be taken as illustrative and not in a limiting sense.

The microphone illustrated in FIG. 2 is a directional microphone sensing a pressure gradient. The microphone has the same basic structure as the microphone in FIG. 1, but in order to obtain directional sensitivity an opening 24 has been introduced between to the backchamber 11 so as to allow for an acoustic wave to enter the backchamber 11. The deflection of the membrane 12 is therefore a measure for the pressure gradient over the membrane 12, resulting in a directional sensitivity.

The microphones illustrated in FIG. 3 is also a directional microphone. This microphone senses a phase diference of an impinging acoustical wave. The microphone has the same basic structure as the microphone in FIG. 1, however, the microphone in FIG. 3 uses two sensing elements in the first substrate 1, both containing a membrane 12 and a back-plate 13 and both being connected to the second substrate 3 by solder bumps 8 and seal ring 9 with a cavity 11 and 11' for each sensing element and both covered by a filter 5. Cavity 10' has openings 20 and 21, while cavity 11' has opening 22.

It will be evident for the skilled person to increase the number of sensing elements from two (as shown in FIG. 3) to an arbitrary number of sensing elements—e.g. arranged in an array of columns and rows.

What is claimed is:

1. A transducer comprising
   a first Si-based chip with a first upper surface and a first lower surface opposite the first upper surface and enclosing a first chamber extending from a first opening of the first chamber at the first upper surface and through the first Si-based chip to a second opening at the first lower surface, said first Si-based chip further comprising a first diaphragm that is positioned at the first lower surface and covering the second opening,
   a second Si-based chip with a second upper surface and a second lower surface, the second Si-based chip enclosing a second chamber extending into the second Si-based chip from a third opening at the second upper surface, the first Si-based chip being positioned on the second Si-based chip with the second opening aligned with the third opening,
   wherein the second Si-based chip further comprises a Si-based integrated circuit, said Si-based integrated circuit being electrically connected to the first diaphragm via one or more contact elements, and said Si-based integrated circuit being integrated with the second Si-based chip and being positioned at the second upper surface of the second Si-based chip.

2. A transducer according to claim 1, further comprising a first back plate that is arranged adjacent and substantially parallel to the first diaphragm.

3. A transducer according to claim 2, wherein the first diaphragm and the first back plate are conductive and form a capacitor in combination.

4. A transducer according to claim 2, further comprising additional contact elements for connection of the first back plate to the Si-based integrated circuit.

5. A transducer according to claim 4, wherein the contact elements form solder bumps, said solder bumps forming an airtight seal between the first and second Si-based chips.

6. A transducer according to claim 5, wherein the airtight seal forms a ring comprising epoxy.

7. A transducer according to claim 1, further comprising a fourth opening between the second chamber in the second Si-based chip and the second lower surface.

8. A transducer according to claim 1, further comprising a filter covering the first opening.

9. A transducer according to claim 1, further comprising an encapsulation, said encapsulation surrounding the first and second Si-based chips and having an opening that is aligned with the first opening.

10. A transducer according to claim 1, further comprising
    a third chamber being enclosed in the first Si-based chip and extending from a fifth opening of the third chamber at the first upper surface and through the first Si-based chip to a sixth opening at the first lower surface,
    a second diaphragm that is positioned at the first lower surface and covering the sixth opening of the third chamber, and
    a fourth chamber extending into the second Si-based chip from a seventh opening at the second upper surface, the sixth opening of the third chamber being aligned with the seventh opening.

11. A transducer according to claim 10, further comprising a second back plate that is arranged adjacent and substantially parallel to the second diaphragm.

12. A transducer according to claim 11, wherein the second diaphragm and the second back plate are conductive and form a capacitor in combination.

13. A transducer according to claim 10, further comprising solder bumps for connection of the second diaphragm and the second back plate to the Si-based integrated circuit.

14. A transducer according to claim 10, further comprising a filter covering the fifth opening.

15. A transducer according to claim 10, further comprising an encapsulation, said encapsulation surrounding the first and second Si-based chips and having openings that are aligned with the first and fifth opening.

16. A transducer comprising
    a first Si-based chip with a first upper surface and a first lower surface opposite the first upper surface and enclosing a first chamber extending from a first opening of the first chamber at the first upper surface and through the first Si-based chip to a second opening at the first lower surface, said first Si-based chip further comprising a first diaphragm that is positioned at the first lower surface and covering the second opening,
    a second Si-based chip with a second upper surface and a second lower surface, the second Si-based chip enclosing a second chamber extending into the second Si-based chip from a third opening at the second upper surface, the first Si-based chip being positioned on the second Si-based chip with the second opening aligned with the third opening,
    said transducer, further comprising
      a third chamber being enclosed in the first substrate and extending from a fifth opening of the third chamber at the first upper surface and through the first substrate to a sixth opening at the first lower surface,
      a second diaphragm that is positioned at the first lower surface and covering the sixth opening of the third chamber, and
      a fourth chamber extending into the second substrate from a seventh opening at the second upper surface, the sixth opening of the fourth chamber being aligned with the seventh opening.

17. A transducer according to claim 16, further comprising a second back plate that is arranged adjacent and substantially parallel to the second diaphragm.

18. A transducer according to claim 17, wherein the second diaphragm and the second back plate are conductive and form a capacitor in combination.

19. A transducer according to claim 16, wherein the second diaphragm is operationally connected to an integrated circuit.

20. A transducer according to claim 19, further comprising solder bumps for connection of the second diaphragm and the second back plate to the integrated circuit.

21. A transducer according to claim 16, further comprising a filter covering the fifth opening.

22. A transducer according to claim 16, further comprising an encapsulation containing the first and second substrates and having an opening that is aligned with the first and fifth opening.

* * * * *